May 20, 1947.　　　　　R. SIMPSON　　　　　2,420,985

INDICATING KNOB FOR SWITCHES AND THE LIKE

Filed March 10, 1945

Inventor
Ray Simpson
By: McCaleb, Wendt & Dickinson
Attys.

Patented May 20, 1947

2,420,985

UNITED STATES PATENT OFFICE 2,420,985

INDICATING KNOB FOR SWITCHES AND THE LIKE

Ray Simpson, River Forest, Ill.

Application March 10, 1945, Serial No. 582,079

3 Claims. (Cl. 74—553)

1

The present invention relates to indicating knobs for switches and the like, and is particularly concerned with knobs of the type which are used for rotating a switch shaft or rotating the shaft of some other manually controlled device which requires a pointer to indicate the position of the switch.

In the devices of the prior art molded switch knobs have been made which were provided with a pointer with a groove in the face of the pointer, which groove was usually filled with a plastic paint of a contrasting color. For example, if the molded switch knob was of black Bakelite, the paint in the groove for forming an indicating line would be white or some other contrasting color.

Such switch knobs of the prior art require additional operations and labor in their construction, and are therefore more expensive, as labor is one of the most important factors in the cost of manufacture. The devices of the prior art are also subject to the disadvantage that the indicating line may be obliterated by loss of the paint or other contrasting colored material in the groove; and thus the devices of the prior art may lose one of their most important characteristics; that is, accuracy, due to loss of the colored line.

One of the objects of the present invention is the provision of an improved switch knob which may be provided with an indicating line of a contrasting color that is more clearly visible at a distance than the devices of the prior art, and which may be constructed more cheaply than the devices of the prior art.

Another object of the invention is the provision of an improved molded switch knob provided with an indicating pointer and a line for more accurate indication on the pointer, which may be manufactured by molding, with the indicating line secured to the knob at the same time in the form of a strip of metal.

Another object of the invention is the provision of an improved switch knob which is more efficient and which is more economical and which is sturdy and serviceable, and which may be used for a long period of time without necessity for repair.

Other objects and advantages of the invention will be apparent from the following description and the accompanying drawings, in which similar characters of reference indicate similar parts throughout the several views.

Referring to the single sheet of drawings accompanying the specification,

2

Figure 1:
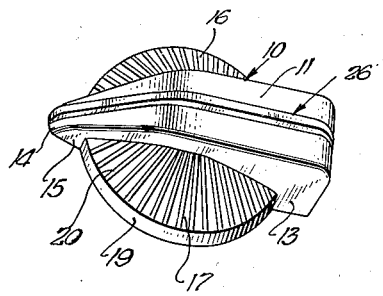
Fig. 1 is a view in perspective of a switch knob embodying my invention.
Figure 2:
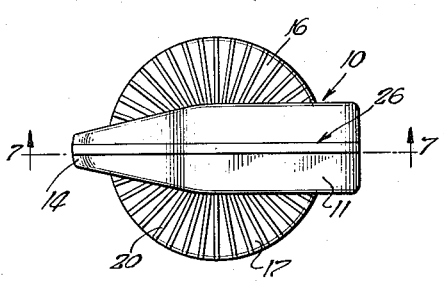
Fig. 2 is a top plan view of the switch knob.
Figure 3:
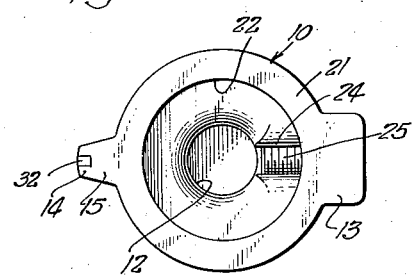
Fig. 3 is a bottom plan view of the switch knob.
Figure 4:
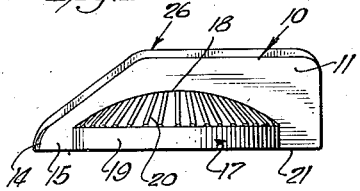
Fig. 4 is a side elevational view of the switch knob.
Figure 5:
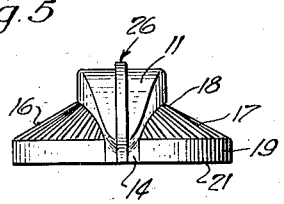
Fig. 5 is a front elevational view of the switch knob.
Figure 7:
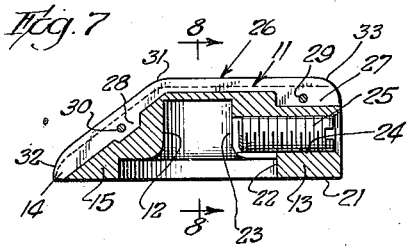
Fig. 7 is a sectional view, taken on the plane of the line 7—7 of Fig. 2, looking in the direction of the arrows.
Figure 8:
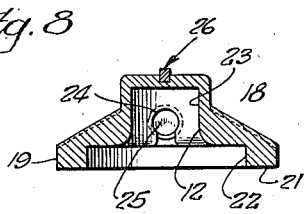
Fig. 8 is a sectional view, taken on the plane of the line 8—8 of Fig. 7, looking in the direction of the arrows.
Figure 6:
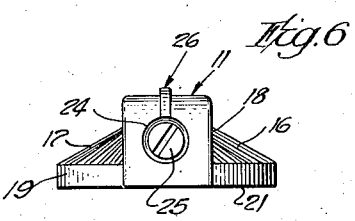
Fig. 6 is a rear elevational view of the switch knob.

Referring to the drawings, 10 indicates in its entirety a switch knob embodying my invention. The switch knobs embodying my invention are preferably provided with a substantially wedge-shaped body 11, which may have its major portion substantially rectangular in cross section, as shown in Fig. 7. The major portion is that part 13 which extends toward the right from the left-hand side of the bore 12. At its left end the body 11 tapers downwardly to a pointed end 14, and the body 11 also preferably tapers in width at the pointer end 15, so that the point 14 is substantially narrower in width than the main body portion 11.

The present switch knob is preferably molded out of some form of molding powder or a modern moldable plastic, or a phenolic condensation compound, and preferably comprises an integral member, the body portion 11 of which also supports at each side an integral partially circular disc formation 16, 17.

The disc formation is located only at the bottom of the main body 11, and it is also preferably tapered in thickness toward its outer edge so that it is thicker where it joins the body at 18 than it is at its edge 19, for ornamental purposes. The laterally projecting disc formations 16 and 17 may be provided with a multiplicity of raised projecting radial ribs 20 extending from the body 11 to the edge of each disc formation on the upper frusto-conical surface thereof.

The lower face 21 of the knob is preferably substantially plane, and is provided with a bore 22 and a counterbore 23. The bore 22 is shallow, but it is adapted to encompass and provide spaces for thin securing nuts, which might be located on a shaft on the face of a panel. The bore 23 is smaller than the bore 22, and is adapted to receive the end of the shaft which is to be actuated by the knob. The bore 23 communicates with a transverse threaded bore 24, which is adapted to receive a set screw 25 threaded in the bore 24 and located to engage a shaft that is inserted in the bore or socket 23. At the upper face of the main body portion 11 and pointer end 15 the knob is provided with an embedded metal strip, indicated in its entirety by the numeral 26.

This metal strip may be made of any suitable metal which is of contrasting color from the color of the insulating knob 10. For example, the strip might be made of stainless steel or other non-corrodible material. The strip 26 is relatively narrow in thickness as seen in Figs. 1, 2, 5, 6, and 8, its function being to provide the accurately centered portion of the pointer by which indication is made.

Its vertical width preferably varies in such manner as to save material wherever possible. For this purpose the strip 26 has a wider depending attaching flange 27 at its rear end, and may be made slightly wider at an attaching flange 28 inside the pointer end 15.

Attaching flanges may have through bores 29 or 30, or the metal strip 26 may at certain points be provided with a transverse slot, and the flanges on each side of the slot bent in opposite directions to provide an anchor for the strip in the molded knob. The strip 26 extends horizontally across the middle top of the main body portion 11 of the knob, and is bent downwardly at 31, where the pointer begins to taper downwardly and extends the full length of the pointer end, terminating in such manner that it projects slightly beyond the pointer end 14.

The strip 26 is preferably curved at its extreme pointer end 32 and at its point of downward bend 31 and at its rear corner 33, so that it will not have any sharp projecting corners. Such a strip may be secured in the molded knob by placing the strip in the mold before the knob is made or molded.

In such case the strip would be placed in a suitable slot in the mold, the slot being shaped to receive that portion of the strip which now projects from the top of the knob. The strip would be held in the mold by friction and gravity; and when the knob is molded, the portion of the strip which projects from the mold into the cavity would be embedded in the body of the knob as shown in Fig. 7.

Such a metal strip indicates more accurately the pointer position in registry with other indicating devices, such as lines or scales or scale divisions, than the devices of the prior art which employ a groove filled with paint. Such a metal strip is also more serviceable and permanent, and continued use only makes the strip more bright and a better indicator or pointer than it was before; whereas with the prior art devices the paint in the line or groove inevitably wore off as time passed.

Against the background of black or other somber colors, or colors which contrast with the appearance of stainless steel or other silver colored metals, the present device shows up very clearly at a greater distance than the knobs of the prior art. It is thus more easy for a user of electrical devices to see where the pointer of the knob is pointing and to determine what the conditions are, without approaching so closely to the device bearing the knob.

It will thus be observed that I have invented an improved switch knob having an improved indicating pointer that is adapted to be constructed economically with a minimum amount of labor, and which may be used for a long period of service, while being kept in good condition by the service or wear to which it is subjected.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In an indicating knob for electric switches and the like, an elongated body of substantially rectangular form in plan and elevation having at one end a downwardly and laterally tapered pointer formation, said body having a centrally located lower bore molded therein for receiving the end of a shaft and having a longitudinally extending threaded bore located in the end opposite to said pointer formation communicating with said first mentioned bore and provided with a clamping screw, said body having molded in its upper surface and in the forward tapered surface of said pointer formation an elongated metal strip embedded in a groove and provided with through apertures through which the molded material of the knob extends to anchor the strip in its groove, said strip having a horizontally extending portion in the upper surface of said knob, and a diagonally downwardly extending portion in the upper surface of the pointer formation serving as a visible indicator mark for the pointer.

2. In an indicating knob for electric switches and the like, an elongated body of substantially rectangular form in plan and elevation having at one end a downwardly and laterally tapered pointer formation, said body having a centrally located lower bore molded therein for receiving the end of a shaft and having a longitudinally extending threaded bore located in the end opposite to said pointer formation communicating with said first mentioned bore and provided with a clamping screw, said body having molded in its upper surface and in the forward tapered surface of said pointer formation an elongated metal strip embedded in a groove and provided with through apertures through which the molded material of the knob extends to anchor the strip in its groove, said strip having a horizontally extending portion in the upper surface of said knob, and a diagonally downwardly extending portion in the upper surface of the pointer formation serving as a visible indicator mark for the pointer, said body also having a pair of integral disk-like formations projecting from its opposite sides and formed on a center which corresponds to the center of said first mentioned bore, said disk formations serving to conceal the aperture in a panel upon which the knob may be mounted.

3. In an indicating knob for electric switches and the like, an elongated body of substantially rectangular form in plan and elevation having at one end a downwardly and laterally tapered pointer formation, said body having a centrally located lower bore molded therein for receiving the end of a shaft and having a longitudinally extending threaded bore located in the end opposite to said pointer formation communicating with said first mentioned bore and provided with a clamping screw, said body having molded in its upper surface and in the forward tapered surface of said pointer formation an elongated metal strip embedded in a groove and provided with through apertures through which the molded material of the knob extends to anchor the strip in its groove, said strip having a horizontally extending portion in the upper surface of said knob, and a diagonally downwardly extending portion in the upper surface of the pointer formation serving as a visible indicator mark for the pointer, said body also having a pair of integral disk-like formations projecting from its opposite sides and formed on a center which corresponds to the center of said first mentioned bore, said disk formations serving to conceal the aperture in a panel upon which the knob may be mounted, said body and disk formations being provided in their lower surfaces with an enlarged counterbore and providing a clearance for securing nuts carried by the shaft to be secured in said first mentioned bore.

RAY SIMPSON.

REFERENCES CITED

The following references are of record in the file of this patent:

UNITED STATES PATENTS

| Number | Name | Date |
| --- | --- | --- |
| 2,082,091 | Adams | June 1, 1937 |
| D. 112,996 | Sammons | Jan. 17, 1939 |

FOREIGN PATENTS

| Number | Country | Date |
| --- | --- | --- |
| 265,698 | Great Britain | Feb. 14, 1927 |